United States Patent
Hao et al.

(10) Patent No.: US 10,990,839 B2
(45) Date of Patent: Apr. 27, 2021

(54) ANTI-COUNTERFEIT METHOD AND SYSTEM FOR ASSISTING IN FACE RECOGNITION

(71) Applicant: PEGATRON CORPORATION, Taipei (TW)

(72) Inventors: Wei-Hua Hao, Taipei (TW); Nien-Chih Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 150 days.

(21) Appl. No.: 16/254,791

(22) Filed: Jan. 23, 2019

(65) Prior Publication Data

US 2019/0318184 A1    Oct. 17, 2019

(30) Foreign Application Priority Data

Apr. 17, 2018 (TW) ................. 107113087

(51) Int. Cl.
G06K 9/00 (2006.01)
G06K 9/46 (2006.01)
G06K 9/20 (2006.01)

(52) U.S. Cl.
CPC ..... G06K 9/00906 (2013.01); G06K 9/00255 (2013.01); G06K 9/00892 (2013.01);
(Continued)

(58) Field of Classification Search
CPC ..... G06K 2009/00939; G06K 9/00255; G06K 9/00892; G06K 9/00906; G06K 9/2054;
(Continued)

(56) References Cited

U.S. PATENT DOCUMENTS

2015/0131879 A1    5/2015  Lu et al.
2016/0078622 A1    3/2016  Hsiao et al.
(Continued)

FOREIGN PATENT DOCUMENTS

CN    103120581 B    11/2015
TW    201129943 A    9/2011
(Continued)

OTHER PUBLICATIONS

Yimin Chen et al, "Your Face Your Heart: Secure Mobile Face Authentication with Photoplethysmograms", IEEE INFOCOM 2017—IEEE Conference on Computer Communications, pp. 1-9. (Year: 2017).*

*Primary Examiner* — Tom Y Lu
(74) *Attorney, Agent, or Firm* — McClure, Qualey & Rodack, LLP.

(57) ABSTRACT

An anti-counterfeit method for assisting in face recognition includes the following steps: capturing a dynamic image of an object; filtering a plurality of time-varying signals from the dynamic image to obtain a plurality of filter signals; and comparing the filter signals and preset biological information that corresponds to the object, to output a determining result. When the dynamic image of the object is captured, according to this method, at least one region is interest is set in the dynamic image, and each time-varying signal corresponds to a time-varying gray-scale value of at least one pixel of the dynamic image in the region of interest. An anti-counterfeit system is also provided.

12 Claims, 5 Drawing Sheets

(52) U.S. Cl.
CPC ......... *G06K 9/2054* (2013.01); *G06K 9/4642* (2013.01); *G06K 2009/00939* (2013.01)

(58) Field of Classification Search
CPC ............. G06K 9/4642; G06K 9/00288; G06K 9/00543; G06K 9/0055
See application file for complete search history.

(56) References Cited

U.S. PATENT DOCUMENTS

| | | | |
|---|---|---|---|
| 2016/0343135 A1* | 11/2016 | De Haan | G06K 9/4652 |
| 2016/0358332 A1* | 12/2016 | Watanabe | G06T 7/0012 |
| 2017/0337365 A1* | 11/2017 | Kikinis | G06K 9/00248 |
| 2019/0014999 A1* | 1/2019 | Yuen | G06K 9/00906 |
| 2019/0081945 A1* | 3/2019 | Chiang | G06K 9/209 |
| 2019/0209052 A1* | 7/2019 | Jeanne | G06K 9/00228 |

FOREIGN PATENT DOCUMENTS

| | | |
|---|---|---|
| TW | 201403547 A | 1/2014 |
| TW | I571100 B | 2/2017 |

\* cited by examiner

ANTI-COUNTERFEIT METHOD AND SYSTEM FOR ASSISTING IN FACE RECOGNITION

CROSS-REFERENCE TO RELATED APPLICATION

This non-provisional application claims priority under 35 U.S.C. § 119(a) to Patent Application No. 107113087 filed in Taiwan, R.O.C. on Apr. 17, 2018, the entire contents of which are hereby incorporated by reference.

BACKGROUND

Technical Field

The application relates to an anti-counterfeit method and system for assisting in face recognition. Specifically, the application relates to an anti-counterfeit method and system that can determine biological information of an object.

Related Art

With the progress of photographing technologies, a digital image capturing technology has also been applied to biometric apparatuses such as a face recognition device. Moreover, how to automate biometrics is also one of the directions that are being developed.

In the biometrics, a face recognition system is one of the main application apparatuses. In addition to being capable of recognizing the identity corresponding to a face in an image, the face recognition system also needs to implement an anti-counterfeit function. An existing masquerading technology, for example, is to present, by using a photo or a highly simulated face model or mask, an image similar to that of an object.

SUMMARY

One objective of the application is to provide an anti-counterfeit system and method for assisting in face recognition, to provide a function of recognizing whether a face is a real face.

Another objective of the application is to provide an anti-counterfeit system and method for assisting in face recognition, to assist in face recognition in confirming the authenticity of a face image.

The anti-counterfeit system for assisting in face recognition of the application can determine biological information of an object, and includes an image capturing unit and a processing unit coupled to the image capturing unit. The image capturing unit captures a dynamic image of the object, and the processing unit receives the dynamic image from the image capturing unit. The processing unit sets at least one region of interest in the dynamic image, and filters a plurality of time-varying signals from the dynamic image to obtain a plurality of filter signals, where each time-varying signals corresponds to a time-varying gray-scale value of at least one pixel of the dynamic image in the region of interest. The processing unit compares the plurality of filter signals and preset biological information corresponding to the object, to output a determining result.

According to the anti-counterfeit method for assisting in face recognition of the application, biological information of an object can be determined. The method includes: capturing a dynamic image of the object and setting at least one region of interest in the dynamic image; filtering a plurality of time-varying signals from the dynamic image to obtain a plurality of filter signals wherein each time-varying signal corresponds to a time-varying gray-scale value of at least one pixel of the dynamic image in the region of interest; and comparing the filter signals and preset biological information corresponding to the object, to output a determining result.

Based on the above, it can be learned that according to the anti-counterfeit method for assisting in face recognition provided in the application, the authenticity of a face image in the dynamic image can be further confirmed by using the filter signals. The anti-counterfeit system for assisting in face recognition provided in the application can capture the dynamic image by using the image capturing unit, and then obtain the filter signals by using the processing unit, to confirm the authenticity of the biological information in the dynamic image.

DETAIL DESCRIPTION OF THE EMBODIMENTS

An anti-counterfeit method for assisting in face recognition of the application is applicable to a dynamic image. The dynamic image, for example, includes various digital data that stores a series of digital static images in forms of digital signals, such as videos. The foregoing dynamic image may come from photosensitive elements such as a charge-coupled device (CCD) and a complementary metal-oxide-semiconductor sensor (CMOS Active pixel sensor), but the application is not limited thereto. The anti-counterfeit method for assisting in face recognition provided in the application may be directly applied to existing dynamic digital image data. The following describes the method in detail by using an embodiment in cooperation with an anti-counterfeit system for assisting in face recognition provided in the application.

Figure 1:
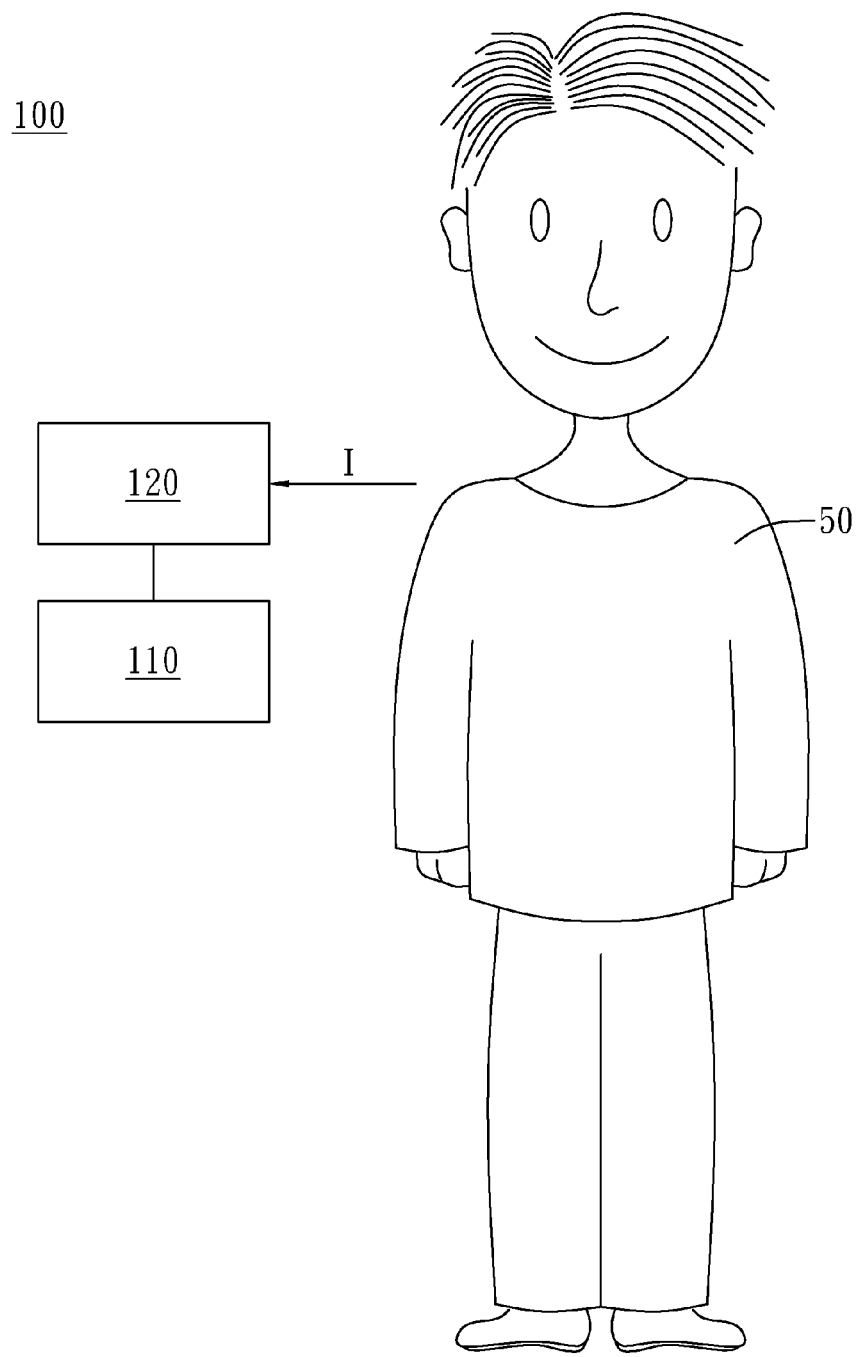
FIG. 1 is a schematic diagram of an anti-counterfeit system for assisting in face recognition according to a first embodiment of the application.

FIG. 1 is a schematic diagram of an embodiment of an anti-counterfeit system 100 for assisting in face recognition of the application. In an embodiment of the application, the anti-counterfeit system 100 for assisting in face recognition of the application may be applied to monitoring, security, anti-theft and other systems or programs. As shown in FIG. 1, the anti-counterfeit system 100 for assisting in face recognition includes a processing unit 110 and an image capturing unit 120.

The image capturing unit 120 of this embodiment is configured to capture a dynamic image I from an object 50, and may be any a device having an image capturing function such as a video camera, a camera, or a digital lens that can photograph a face, or may be a smartphone or a photographing element in another electronic product.

The processing unit 110 of this embodiment, for example, is a central processing unit (CPU) in the foregoing devices, and may receive the dynamic image I captured by the image capturing unit 120. Biological information of an object 50 can be determined by using the anti-counterfeit system 100 for assisting in face recognition and a method used by the system, and the application is mainly applied to recognition of a face or exposed skin of human beings. A dynamic image I obtained by photographing a face of a testee is used as an example herein. The image capturing unit 120 performs image photographing on a testee (that is, the object 50) to generate a dynamic image I, and transmits the dynamic image I to the processing unit 110.

Figure 2:
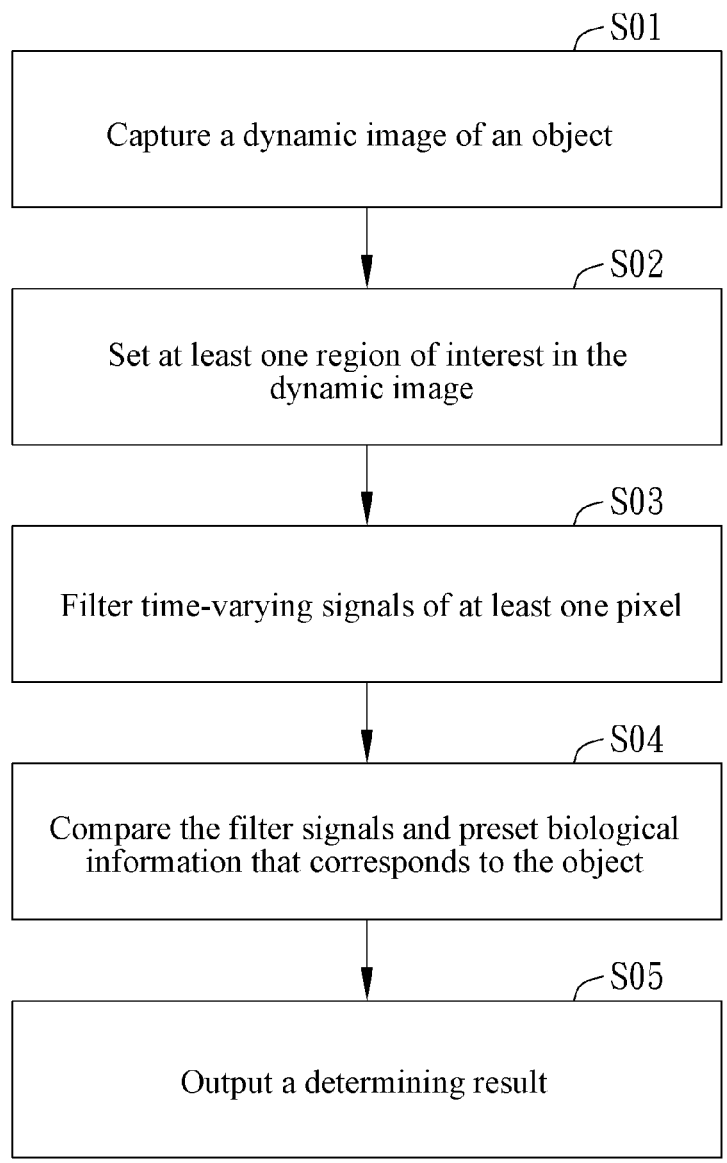
FIG. 2 is a flowchart of an anti-counterfeit method for assisting in face recognition according to the first embodiment of the application.

FIG. 2 is a schematic flowchart of an anti-counterfeit method for assisting in face recognition of the application. Also referring to FIG. 2, after the dynamic image is captured (step S01), the processing unit 110 of this embodiment sets a region of interest in the dynamic image I (step S02), and the processing unit 110 may set one or more regions of interest in the dynamic image I. The region of interest may be, for example, an area in the dynamic image I corresponding to the face of the testee and an area where sufficient skin is exposed, and the dynamic image may be searched by using a program for the area of face or the exposed skin area that occupies a particular area as the region of interest. Preferably, the region of interest is an area corresponding to parts where a large number of capillaries are distributed such as a cheek or a forehead.

For example, the step of setting the region of interest in the anti-counterfeit method for assisting in face recognition of this embodiment may be differentiated by using a spatial frequency in the image. The dynamic image I captured by the image capturing unit 120 of this embodiment, for example, includes a plurality of image frames, and each image frame is composed of a plurality of pixels. Distribution of gray-scale values of the pixels in space is formed by superimposing a plurality of waveforms of different frequencies. The following makes descriptions by using examples with reference to the drawings.

Figure 3A:
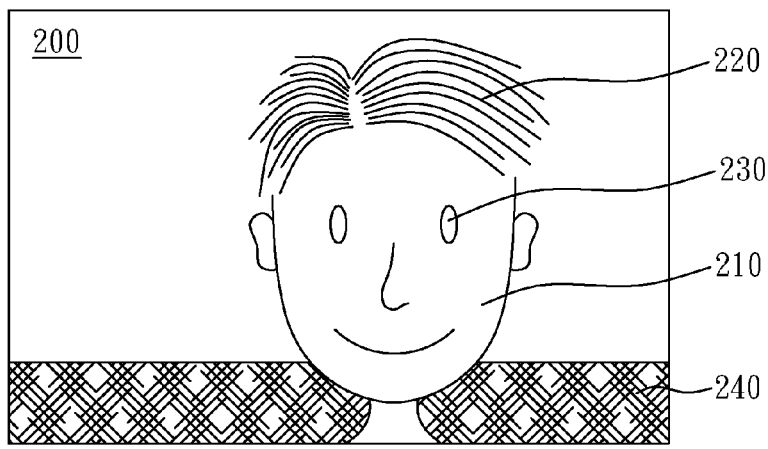
FIG. 3A to FIG. 3C are schematic diagrams of a dynamic image according to the first embodiment of the application.

A method for setting the region of interest of this embodiment may be, for example, selecting image frames that have a same spatial frequency or whose spatial frequencies fall within a same frequency band. FIG. 3A, for example, shows an image frame 200 including a face image 210 of an object, and the image frame 200 further includes a hair image 220, an eye image 230, and a background image 240. Using FIG. 3A as an example, because details and complexity of the hair image 220, the eye image 230, and the background image 240 in the image frame 200 are relatively high, spatial frequencies of the areas are relatively high. Because details and complexity of the face image 210 are relatively low, the face image 210 has a relatively low spatial frequency. Therefore, the face image 210 (that is, FIG. 3B) corresponding to the face in the image can be differentiated from other regions by selecting a spatial frequency or frequency band. According to the method of this embodiment, the face image 210 may be set to the region of interest. However, the anti-counterfeit method and system for assisting in face recognition of the application are not limited to this setting method. A person of ordinary skill in the art may further apply other methods to differentiate, in the dynamic image, an image corresponding to the face of the testee or an area where sufficient skin is exposed, and set the image as the region of interest.

Figure 3B:
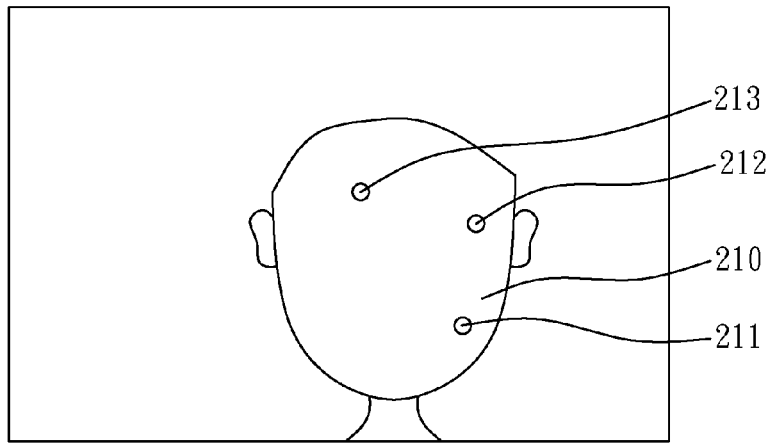

Referring to FIG. 3B, the region of interest set by using the method of this embodiment, for example, includes the face image 210. After the region of interest is set (step S02), according to the anti-counterfeit method for assisting in face recognition of this embodiment, time-varying signals corresponding to pixels 211, 212, and 213 are filtered (step S03). Specifically, because the dynamic images are composed of a plurality of image frames arranged with time, a gray-scale value of each pixel in the dynamic image varies with time, and the time-varying signal is, for example, a gray-scale value signal recorded along a time axis of one pixel.

Figure 4A:
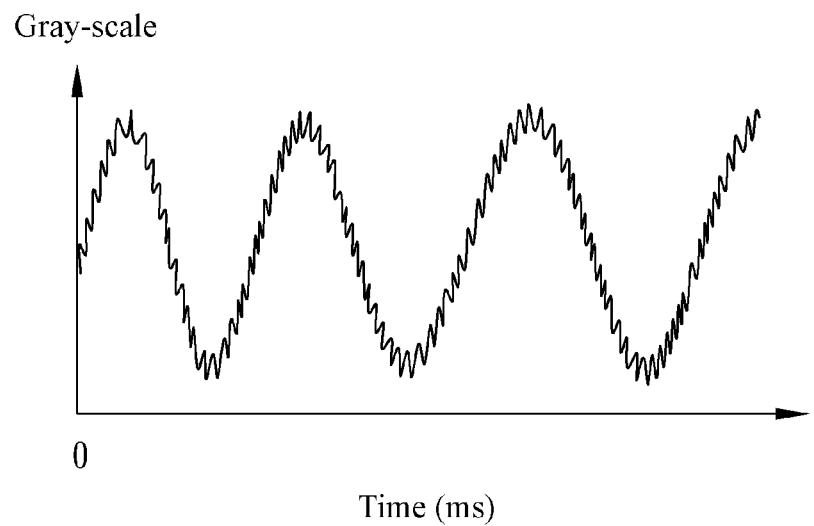
FIG. 4A and FIG. 4B are schematic diagrams of a signal according to the first embodiment of the application.

According to the anti-counterfeit method for assisting in face recognition of this embodiment, filtering is performed for variation of gray-scale values of pixels, to determine biological information of the object. Skin of a living being generates a slight skin color variation due to flow of blood vessels under the skin, and the skin color variation frequency also corresponds to heartbeats of the living being. Therefore, biological information of an object can be determined by observing whether a skin color of the skin varies with time. For example, FIG. 4A shows, for example, a time-varying signal corresponding to the pixel 211. Because time-varying signals are filtered (step S03) according to the anti-counterfeit method for assisting in face recognition of this embodiment, some signals carrying biological information may be taken out of the time-varying signals.

Figure 4B:
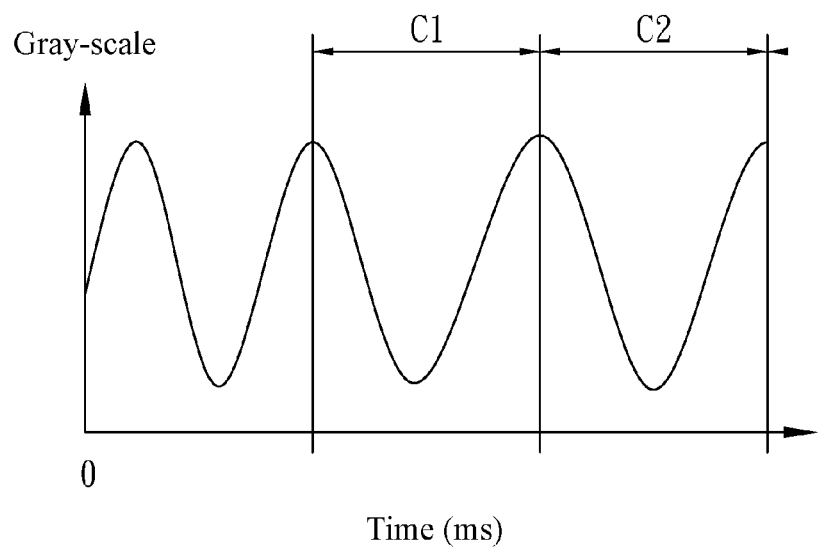

The time-varying signals are filtered (step S03), so that noise in the time-varying signals can be removed by using the anti-counterfeit method for assisting in face recognition of this embodiment. FIG. 4B shows a filter signal corresponding to the pixel 211. The filter signal can be compared with preset biological information of the object according to the anti-counterfeit method for assisting in face recognition of this embodiment. The preset biological information may include, for example, pre-stored frequency information, or may be a method for comparing whether biological information falls within a reasonable range.

When the filter signals and the preset biological information that corresponds to the object are compared (step S04), a plurality of anti-counterfeit modes for the foregoing filter signals may also be implemented according to the anti-counterfeit method for assisting in face recognition of this embodiment. The modes may be individually and independently implemented to simplify a procedure and improve a recognition speed, and may also be simultaneously implemented to further enhance recognition strength. The application is not limited thereto. Detailed content of various reorganization modes will be listed one by one below.

In a first mode, whether the filter signals vary with time is determined according to the anti-counterfeit method for assisting in face recognition of this embodiment. For example, referring to FIG. 4B, low-frequency signals are filtered out in a low-pass filtering manner in step S03 according to the anti-counterfeit method for assisting in face recognition of this embodiment to reduce high-frequency noise. Whether the dynamic image has slight differences caused by blood circulation can be determined by observing whether the filter signals vary with time.

In other words, whether an image corresponding to the object of the dynamic image carries biological information of the object is determined by determining whether filter signals vary with time, thereby further confirming that the dynamic image comes from a real object. When the filter signals do not vary with time, the processing unit 110 of this embodiment may, for example, outputs a warning result or a result that determining is incorrect (step S05).

A frequency of a filter signal may be further determined by using the anti-counterfeit modes of the anti-counterfeit method for assisting in face recognition of this embodiment.

In a second mode, according to the anti-counterfeit method for assisting in face recognition of this embodiment, when the filter signals and the preset biological information that corresponds to the object are compared (step S04), whether variation of the filter signals has periodicity is determined. Because the dynamic image of the real object generates periodical variation due to stable heartbeats, misjudgment caused by filter signals carrying low-frequency noise may be further excluded by determining whether the variation of the filter signals has periodicity.

In other words, referring to FIG. 4B, according to the anti-counterfeit method for assisting in face recognition of this embodiment, whether a gray-scale value of the pixel 221 in the region of interest of the dynamic image has a reasonable periodical variation. That is, whether a period C1 and a period C2 that come from the filter signal of the pixel 221 are substantively similar, may be determined, so as to determine whether the image in the region of interest of the dynamic image comes from a real object.

Further, according to the anti-counterfeit method for assisting in face recognition of this embodiment, the time-varying signal may be further filtered for a specific frequency band, to determine whether gray-scale values of pixels of the region of interest in the dynamic image fall within a reasonable range after filtering.

In a third mode of the anti-counterfeit method for assisting in face recognition of this embodiment, the step of filtering the time-varying signals (step S03) further includes performing band-pass filtering on the time-varying signals by using a preset heartbeat range. The preset heartbeat range, for example, is a heartbeat frequency range of a normal human body obtained by lots of statistics, and after the band-pass filtering is performed on the time-varying signals by using the preset heartbeat range, the filter signals that fall within the preset range have a bigger chance of being related to heartbeats of the testee.

Usually, a reasonable heartbeat frequency range is between 0.4 Hz and 4 Hz. That is, a period of heartbeats is between 0.25 seconds and 2.5 seconds. In this embodiment, the preset heartbeat range may also be set to this value. Therefore, assuming that there is a signal corresponding to a heartbeat frequency in the region of interest of the dynamic image, the signals can be taken out by using the step S03 of filtering the time-varying signals. That is, referring to FIG. 4B, pixels whose gray-scale values periodically vary in the region of interest of the dynamic image are screened out by means of filtering, and variation periods of the pixels also fall within a normal heartbeat period range 0.25 seconds to 2.5 seconds of a common human body, thereby further confirming that an image corresponding to the pixel comes from a real object.

According to the anti-counterfeit method for assisting in face recognition of this embodiment, the recognition modes can be further implemented by means of image processing in addition to directly determining an implementation of a filter signal. This is not limited in the application. For example, after the filter signals are obtained, a first gain dynamic image can be generated by superimposing the filter signals back to the original dynamic image. Preferably, a second gain dynamic image may further be generated by amplifying the filter signals and then superimposing the amplified filter signals back to the original dynamic image. Therefore, when the foregoing biological information appears in the region of interest of the dynamic image, an image in the second gain dynamic image may be determined more directly. Implementations of the foregoing modes are described below by using the foregoing image processing method as an example.

When the region of interest of the dynamic image I is a skin image of the object 50, in the foregoing first mode, an implementation of whether filter signals vary with time may be determined by whether a color of an image corresponding to the skin of the object 50 in the second gain dynamic image varies with time.

In the foregoing second mode, the implementation of whether filter signals have periodical variations may also be determined by whether the image of the skin of the object 50 has a periodical variation in the second gain dynamic image.

In the foregoing third mode, if the time-varying signals are filtered for the preset heartbeat range in the filtering step, a skin color variation is displayed in the second gain dynamic image only when a skin color variation frequency falls within the preset heartbeat range, and an image difference formed by, for example, an ambient light variation is filtered out.

Figure 3C:
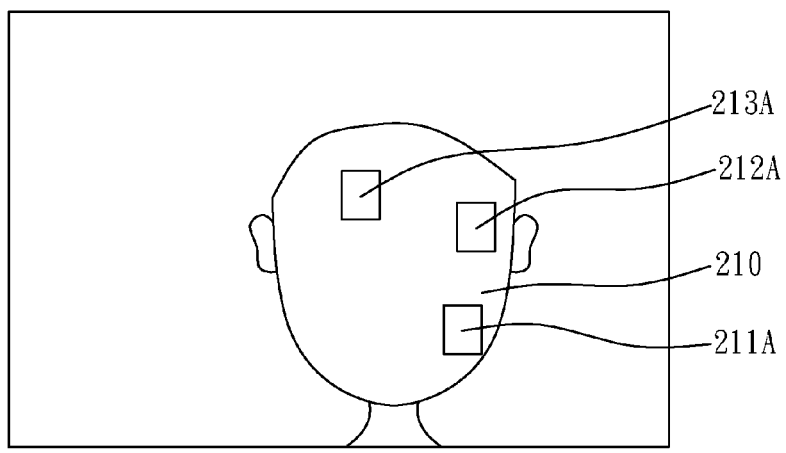
Figure 5:
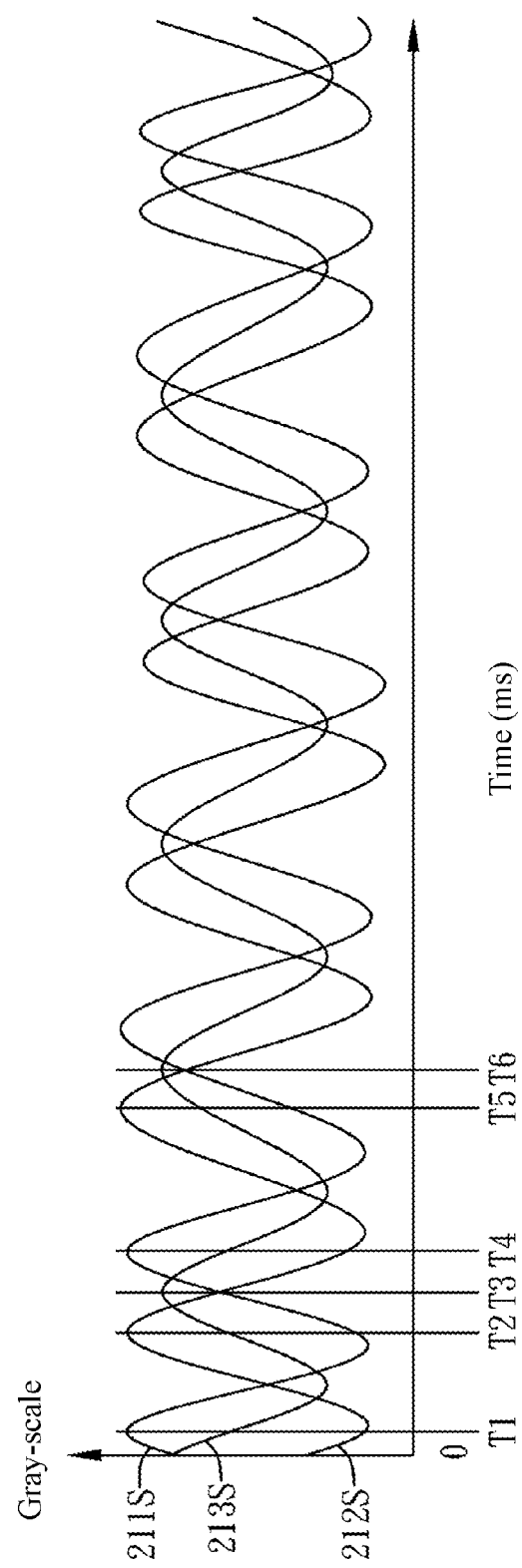
FIG. 5 is a schematic diagram of a plurality of filter signals according to the first embodiment of the application.

According to the anti-counterfeit method for assisting in face recognition of this embodiment, a relationship between a plurality of filter signals may be further recognized. FIG. 5 shows region gray-scale values corresponding to a plurality of blocks in FIG. 3C, that is, region gray-scale values 211S, 212S, and 213S corresponding to blocks 211A, 212A, and 213A. The blocks 211A, 212A, and 213A fall within the region of interest (that is, the face image 210), and each of the blocks 211A, 212A, and 213A cover a plurality of pixels. For example, an average of gray-scale values of the pixels in the block 211A at some instant is a region gray-scale value of the block 211A. After recording for a period of time, each of the blocks 211A, 212A, and 213A has a plurality of region gray-scale values.

According to the anti-counterfeit method for assisting in face recognition of this embodiment, before the region gray-scale values 211S, 212S, and 213S, and the preset biological information that corresponds to the object 50 are compared (step S04), a pre-stored variation sequence corresponding to the object may be obtained in advance. The pre-stored variation sequence may be data pre-stored in a storage unit of the anti-counterfeit system, and includes a sequence in which maximum values or peaks of region gray-scale values that correspond to the blocks 211A, 212A, and 213A appear in the dynamic image when the object is previously tested. If the foregoing second gain dynamic image is used as an example, the pre-stored variation sequence is a time sequence in which maximum color variations appear at positions that correspond to the blocks 211A, 212A, and 213A in the second gain dynamic image.

After the pre-stored variation sequence is obtained, according to the anti-counterfeit method for assisting in face recognition used by the processing unit 110 of this embodiment, region gray-scale values of pixels of the blocks 211A, 212A, and 213A from a currently captured dynamic image are recorded, and time points T1, T2, T3, T4, T5, and T6 (for example, six points are taken herein) at which peaks appear are obtained. Then, a block variation sequence is obtained through arrangement based on the foregoing time sequence. For example, referring to FIG. 5, time points at which peaks of region gray-scale values of the block 211A appear are time points T1 and T4, time points at which peaks of region gray-scale values of the block 212A appear are time points T2 and T5, and time points at which peaks of region gray-scale values of the block 213A are time points T3 and T6. Therefore, based on the original time sequence, the block variation sequence may be arranged as: (P1, P2, P3, P1, P2, P3).

P1 represents that the peaks of the region gray-scale values of the block 211A appear, P2 represents that the peaks of the region gray-scale values of the block 212A appear, and P3 represents that the peaks of the region gray-scale values of the block 213A appear. Then the processing unit 110 obtains the pre-stored variation sequence from, for example, the storage unit, and determines, by comparing whether the block variation sequence is the same as the pre-stored variation sequence, whether the dynamic image carries the biological information of the object.

Using a human face as an example, a skin color of the face varies not only with the heartbeat, but also with a direction in which blood flows in the face. Because human blood vessel distribution can also serve as reference information for identification, different people have different blood vessel distributions. According to the anti-counterfeit method for assisting in face recognition of this embodiment, when region gray-scale values calculated based on the filter signals are determined, although frequencies of the filter signals vary with a heartbeat speed, the time sequence in which the peaks of the region gray-scale values appear still remains unchanged. Therefore, by comparing whether the foregoing block variation sequence is the same as the pre-stored variation sequence, according to the anti-counterfeit method of this embodiment, whether the dynamic image carries the preset biological information of the object can be determined and the determining result is output.

On the other hand, in the foregoing embodiment, a sequence in which maximum values or peaks appear is used as the determining basis, but in other embodiments, comparison can also be performed by using a sequence in which minimum values or valleys or even self-defined feature values appear. The application is not limited thereto. In the foregoing embodiment, region gray-scale values are used for recording and determining to reduce the overall amount of calculation. In other embodiments, other reference values may also be obtained through conversion by using gray-scale values of pixels in the blocks, and the calculated number of pixels can also be adjusted to control the determining accuracy. The application is not limited thereto.

The anti-counterfeit method for assisting in face recognition of this embodiment is not limited to the foregoing steps. Before the foregoing anti-counterfeit method is performed, an identity of an image frame in the dynamic image may further be directly recognized, and then the authenticity is confirmed in cooperation with the foregoing anti-counterfeit method, thereby providing a more accurate identity recognition function. In other embodiments, according to the anti-counterfeit method for assisting in face recognition, whether the amount of variation in the dynamic image is less than a preset threshold may further be pre-compared, that is, whether the image is taken from an object that does not violently shake or move is predetermined, to reduce a change of misjudgment.

In summary, according to the anti-counterfeit method for assisting in face recognition provided in the embodiments of the application, pixels in a region of interest in a dynamic image may be determined, and filtering is performed for variation frequencies of gray-scale values of the pixels in time domain, to screen out some information that has biological information in the dynamic image, thereby further determining whether the dynamic image carries preset biological information of the object, and enhancing the anti-counterfeit accuracy. The anti-counterfeit system for assisting in face recognition of the embodiments of the application compares filter signals from the dynamic image, so that not only can recognize an identity of an image that corresponds to the object in the dynamic image, but also can determine whether the image of the object comes from a real object.

What is claimed is:

1. An anti-counterfeit method for assisting in face recognition, for determining biological information of an object, and comprising:
   capturing a dynamic image of the object, and setting at least one region of interest in the dynamic image;
   filtering a plurality of time-varying signals to obtain a plurality of filter signals, wherein each time-varying signal corresponds to a time-varying gray-scale value of at least one pixel of the dynamic image in the region of interest; and
   comparing the plurality of filter signals and preset biological information corresponding to the object, to output a determining result.

2. The anti-counterfeit method for assisting in face recognition according to claim 1, wherein the dynamic image comprises a plurality of image frames, and a distribution frequency in space of gray-scale values of pixels in each image frame that belong to the region of interest falls within a same frequency or a same frequency band.

3. The anti-counterfeit method for assisting in face recognition according to claim 1, wherein the step of comparing the plurality of filter signals and the preset biological information corresponding to the object comprises:
   determining whether the plurality of filter signals varies with time.

4. The anti-counterfeit method for assisting in face recognition according to claim 1, wherein the step of comparing the plurality of filter signals and the preset biological information corresponding to the object comprises:
   determining whether variation of the plurality of filter signals has periodicity.

5. The anti-counterfeit method for assisting in face recognition according to claim 1, wherein the step of filtering the plurality of time-varying signals to obtain the plurality of filter signals comprises:
   performing band-pass filtering on the plurality of time-varying signals by using a preset heartbeat range.

6. The anti-counterfeit method for assisting in face recognition according to claim 1, wherein the step of comparing the plurality of filter signals and the preset biological information corresponding to the object comprises:
   obtaining a pre-stored variation sequence of the at least one region of interest of the dynamic image corresponding to the object;
   recording a plurality of region gray-scale values of a plurality of blocks of the region of interest, wherein the plurality of region gray-scale values are respectively averages of gray-scale values of the plurality of filter signals corresponding to one of the blocks at different time, and finding time points at which peaks of the region gray-scale values corresponding to the blocks appear;
   arranging the plurality of the blocks based on the time points at which the peaks appear, to obtain a block variation sequence; and
   comparing whether the block variation sequence is the same as the pre-stored variation sequence.

7. An anti-counterfeit system for assisting in face recognition, for determining biological information of an object, and comprising:

an image capturing unit, configured to capture a dynamic image of the object; and a processing unit, coupled to the image capturing unit to receive the dynamic image, and configured to set at least one region of interest in the dynamic image, and filter a plurality of time-varying signals to obtain a plurality of filter signals, wherein each time-varying signal corresponds to a time-varying gray-scale value of at least one pixel of the dynamic image in the region of interest; and wherein the processing unit compares the plurality of filter signals and preset biological information corresponding to the object, to output a determining result.

8. The anti-counterfeit system for assisting in face recognition according to claim 7, wherein the dynamic image captured by the image capturing unit comprises a plurality of image frames, and a distribution frequency in space of gray-scale values of pixels of each image frame in the region of interest set by the processing unit falls within a same frequency or a same frequency band.

9. The anti-counterfeit system for assisting in face recognition according to claim 7, wherein when the processing unit compares the plurality of filter signals and the biological information corresponding to the object, the processing unit determines whether the plurality of filter signals varies with time.

10. The anti-counterfeit system for assisting in face recognition according to claim 7, wherein when the processing unit compares the plurality of filter signals and the biological information corresponding to the object, the processing unit determines whether variation of the plurality of filter signals has periodicity.

11. The anti-counterfeit system for assisting in face recognition according to claim 7, wherein when the processing unit filters the plurality of time-varying signals, the processing unit performs band-pass filtering on the plurality of time-varying signals by using a preset heartbeat range.

12. The anti-counterfeit system for assisting in face recognition according to claim 7, further comprising a storage unit, wherein the storage unit is coupled to the processing unit and stores a pre-stored variation sequence of the object, and the pre-stored variation sequence corresponds to the at least one region of interest of the dynamic image, wherein when the processing unit compares the plurality of filter signals and the biological information corresponding to the object, the processing unit obtains the pre-stored variation sequence;

the processing unit records a plurality of region gray-scale values of a plurality of blocks of the region of interest, wherein the plurality of region gray-scale values are respectively averages of gray-scale values of the plurality of filter signals corresponding to one of the blocks at different time, and finds time points at which peaks of the region gray-scale values corresponding to the blocks appear;

the processing unit arranges the plurality of the blocks based on time points at which the peaks appear, to obtain a block variation sequence; and the processing unit compares whether the block variation sequence is the same as the pre-stored variation sequence.

\* \* \* \* \*